United States Patent
Shah et al.

(10) Patent No.: US 8,923,113 B2
(45) Date of Patent: Dec. 30, 2014

(54) OPTIMIZATIONS IN MULTI-DESTINATION TREE CALCULATIONS FOR LAYER 2 LINK STATE PROTOCOLS

(75) Inventors: Varun Shah, Milpitas, CA (US); Ayan Banerjee, Fremont, CA (US); Abhay Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 184 days.

(21) Appl. No.: 13/534,726

(22) Filed: Jun. 27, 2012

(65) Prior Publication Data

US 2014/0003228 A1    Jan. 2, 2014

(51) Int. Cl.
*G01R 31/08*    (2006.01)

(52) U.S. Cl.
USPC ........... 370/221; 370/400; 370/225; 370/254; 455/423; 709/238

(58) Field of Classification Search
USPC .................. 370/221, 400, 225, 254; 455/423; 709/238
See application file for complete search history.

(56) References Cited

U.S. PATENT DOCUMENTS

| | | | | |
|---|---|---|---|---|
| 5,699,358 | A * | 12/1997 | Festl et al. | 370/351 |
| 6,775,542 | B1 * | 8/2004 | Vilander et al. | 455/423 |
| 2006/0013127 | A1 * | 1/2006 | Izaiku et al. | 370/225 |
| 2007/0201382 | A1 * | 8/2007 | Ekl et al. | 370/254 |
| 2008/0025203 | A1 * | 1/2008 | Tallet | 370/216 |
| 2009/0259755 | A1 * | 10/2009 | Boucachard et al. | 709/227 |
| 2010/0128732 | A1 * | 5/2010 | Jiang | 370/400 |
| 2012/0106358 | A1 | 5/2012 | Mishra et al. | |
| 2012/0287776 | A1 * | 11/2012 | Inaba | 370/217 |
| 2013/0003532 | A1 * | 1/2013 | Vinod et al. | 370/225 |
| 2013/0315580 | A1 * | 11/2013 | Boertjes et al. | 398/5 |
| 2014/0185429 | A1 * | 7/2014 | Takase et al. | 370/225 |

OTHER PUBLICATIONS

Perlman, et al., "Routing Bridges (RBridges): Base Protocol Specification," Internet Engineering Task Force, RFC 6325, Standards Track, Jul. 2011.
Hildebrand, et al., "XEP-0115: Entity Capabilities," XMPP Standards Foundation, Standards Track, Version 1.5, Feb. 26, 2008.

* cited by examiner

*Primary Examiner* — Hassan Kizou
*Assistant Examiner* — Deepa Belur

(57) ABSTRACT

Techniques to optimize root network node selection for network tree paths are provided. A network disruption event is detected. Network nodes in the network are configured with root priorities. Network nodes in a first set of the network nodes operate as root nodes for ordered network tree paths. Root priority information is retrieved from a database for each of the network nodes. Based on the root priority information, network nodes are selected for a new set of network nodes to operate as new root nodes for new ordered network tree paths upon occurrence of the network disruption event. The new set of network nodes comprises common network nodes present in the first set. An order of the network nodes in the new set is determined such that at least one common network node in the new set is maintained in the same order as that in the first set.

23 Claims, 7 Drawing Sheets

302

| NETWORK NODES | ROOT NODE PRIORITY INFORMATION | DESIGNATED AS ROOT NODE? | ROOT NODE ORDER |
|---|---|---|---|
| A | ✗ 4 | ✗ YES | ✗ 3 |
| B | 1 | YES | 1 |
| C | 2 | YES | 2 |
| ✗ (D IS REMOVED) | ✗ | ✗ NO | ✗ |
| E | ✗ 3 | YES | 4 |
| F | ✗ 5 | NO | — |

SET OF ROOT NODES

| NETWORK NODES | ROOT NODE ORDER | ROOT NODE PRIORITY INFORMATION |
|---|---|---|
| B | 1 | 1 |
| C | 2 | 2 |
| ✗ A | 3 | ✗ 4 |
| E | 4 | ✗ 3 |

D IS REMOVED →

| NETWORK NODE | NETWORK CONNECTIVITY INFORMATION | NEW NETWORK CONNECTIVITY INFORMATION | CHANGE? |
|---|---|---|---|
| A | A-B; A-C; A-D; A-E | A-B; A-C; A-E | YES |
| B | B-A; B-F | B-A | YES |
| C | C-A; C-F | C-A; C-F | NO |
| D | D-A; D-F | — | — |
| E | E-A; E-F | E-A; E-F | NO |
| F | F-B; F-C; F-D; F-E | F-C; F-E | YES |

LINK B-F IS REMOVED

NODE D IS REMOVED

FIG.4

OPTIMIZATIONS IN MULTI-DESTINATION TREE CALCULATIONS FOR LAYER 2 LINK STATE PROTOCOLS

TECHNICAL FIELD

The present disclosure relates to optimizing network communication paths.

BACKGROUND

Layer 2 link state protocols are used by network nodes configured as switching nodes to construct a map of network connectivity within a network. For unicast traffic, multiple network paths may be calculated, and data communications (e.g., packets) may be sent from source nodes to destination nodes across one of these network paths. For multicast messages, multi-destination network tree paths are calculated using a shortest path first (SPF) calculation with several nodes in the network operating as network root nodes. Packets may be sent to destination nodes via one or more of these network tree paths. A network topology, however, may change due to network events. For example, a network node may be removed or added to the network. In such a scenario, the SPF calculation is re-run for the network nodes to determine new network tree paths.

BRIEF DESCRIPTION OF THE DRAWINGS

FIGS. 3A and 3B show examples of data fields of a database comprising root priority information to be used as root nodes for updating ordered network tree paths in response to the network disruption event or network topology change.

FIG. 4 shows examples of data fields in the database comprising network tree path connectivity information to be used for updating routing for network tree paths in response to the network disruption event or network topology change.

DESCRIPTION OF EXAMPLE EMBODIMENTS

Overview

Techniques are provided for optimizing a selection of root network nodes for network tree paths. These techniques may be embodied as a method, apparatus and instructions in a computer-readable storage media to perform the method. At a switch unit of a network node, a network disruption event is detected in a network comprising a plurality of interconnected network nodes, each of which is configured with a root priority. Network nodes in a first set of the network nodes operate as root nodes for ordered network tree paths in the network. Root priority information is retrieved from a database for each of the network nodes in the network. Based on the root priority information, network nodes are selected for a new set of network nodes to operate as new root nodes for new ordered network tree paths upon occurrence of the network disruption event. The new set of network nodes comprises at least one common network node present in the first set. An order of the network nodes in the new set is determined such that at least one common network node in the new set is maintained in the same order as that in the first set.

In addition, techniques are provided for optimizing routing for network tree paths. These techniques also may be embodied as a method, apparatus and instructions in a computer-readable storage media to perform the method. At a switch unit of a network node, a network topology change is detected in a network comprising a plurality of network nodes connected across a plurality of network links. Node connectivity information is retrieved from a database for each of the network nodes. The node connectivity information for each of the network nodes indicates connections across the network links to other network nodes before the network topology change. Data describing the state of the network after the network topology change is evaluated to determine new node connectivity information for each of the network nodes. For a selected network node, it is determined whether or not the new node connectivity information for the selected node indicates that one or more connections to the other network nodes have been disrupted. When the node connectivity information indicates that a connection has been disrupted, a network link is identified corresponding to the disrupted connection. The connection is rebuilt between the selected network node and the other network nodes by generating a network tree path using one or more remaining network links. When the node connectivity information indicates that a connection has not been disrupted, the network link is maintained between the selected network node and the other network nodes.

Example Embodiments

Figure 1:
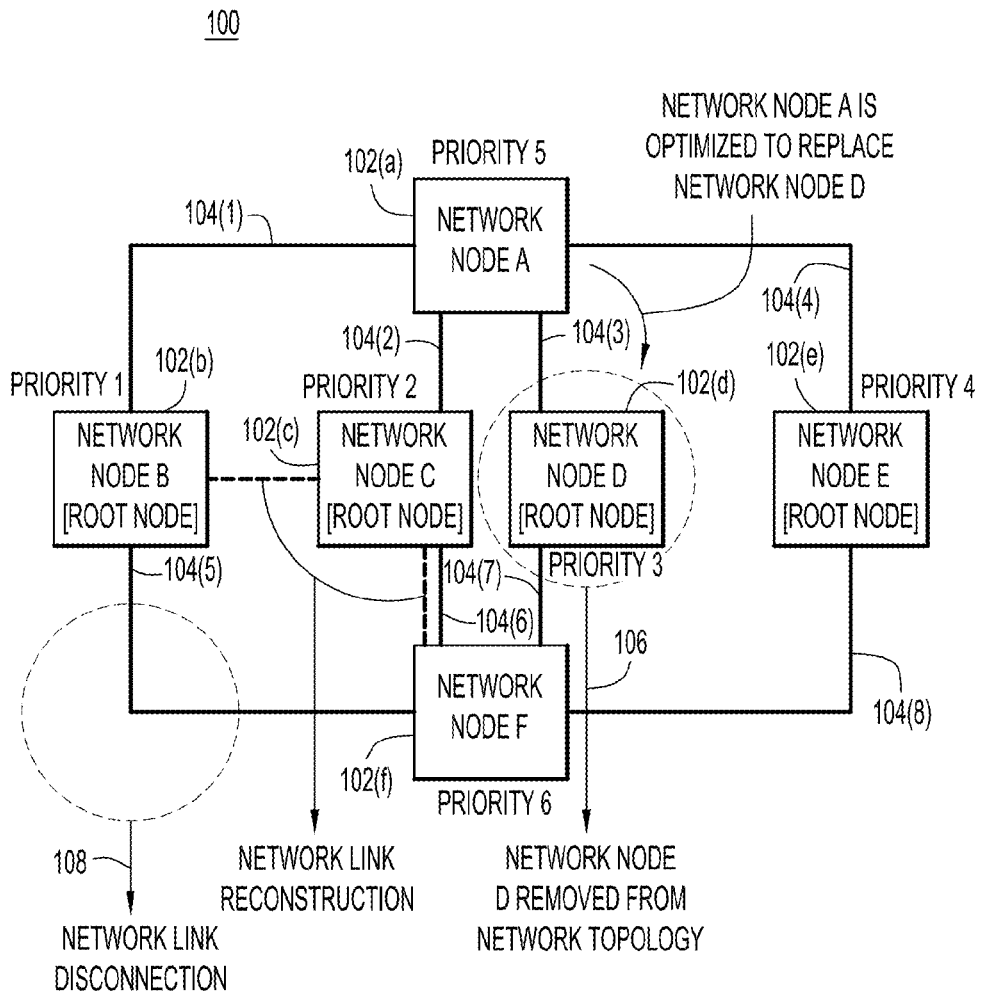
FIG. 1 is a block diagram illustrating an example network topology comprising a plurality of network nodes, each of which is configured to optimize network tree paths for network communication traffic in response to a network disruption event or network topology change.

The techniques described herein are directed to evaluating a network topology to optimize selection of root network nodes and network tree paths. An example network topology 100 ("network") is illustrated in FIG. 1. The network 100 has a plurality of network node devices ("network nodes"), shown at reference numerals 102(a)-102(f). The network nodes 102(a)-102(f) are connected to each other across one or more network links or network paths, shown at reference numerals 104(1)-104(8). For example, as shown in FIG. 1, network node 102(a) ("network node A") is connected to network node 102(b) ("network node B") across link 104(1), to network node 102(c) ("network node C") across link 104(2), to network node 102(d) ("network node D") across link 104(3) and to network node 102(e) ("network node E") across link 104(4). Likewise, network node B is connected to network node 102(f) ("network node F") across link 104(5), network node C is connected to network node F across link 104(6), network node D is connected to network node F across link 104(7) and network node E is connected to network node F across link 104(8). It should be appreciated that network 100 is only an example network topology, and the network 100 may comprise any number of network nodes, and any number of network links may be present in the network 100 to connect the nodes. For example, the network 100 may be a fully meshed network where all of the network nodes are connected to each other, or the network 100 may be a partially meshed network where some of the network nodes are connected to other (but not all) network nodes. It should also be appreciated that the network 100 may be an open systems interconnection (OSI) model layer 2 network.

The network nodes 102(a)-102(f) are network devices that are configured to send, receive and forward network communications (e.g., data packets) to each other in the network 100. For example, the network nodes 102(a)-102(f) may be computer devices, mobile devices, routers, network controllers, switches, servers, etc. In another example, the network nodes 102(a)-102(f) each may be representative or symbolic of a sub-network of additional network node devices.

Often, communications may be exchanged between one or more of the network nodes 102(a)-102(f) across one or more of the network links 104(1)-104(8). For example, unicast traffic and multicast traffic may be sent between network nodes across network links in the network 100. The unicast traffic and multicast traffic may be, for example, layer 2 messages exchanged in accordance with a link state protocol. Additionally, the unicast traffic and multicast traffic may be packets delivered according to the Transparent Interconnect of Lots of Links (TRILL) protocol. These TRILL packets may be used to enable layer 3 routing techniques for a layer 2 network. Unicast traffic is typically delivered to a single destination network node in the network 100, while multicast traffic is typically delivered to multiple destination nodes or a group of destination nodes in the network 100. When multicast traffic is delivered, multiple network tree paths ("network trees") within the network 100 are used to send the traffic to the appropriate destination nodes.

In one example, the multiple network tree paths are generated by first determining which ones of the network nodes 102(a)-102(f) will operate as "root" nodes (i.e., nodes that do not have a parent node in a network tree path) for each of the network trees that are desired. The "root" nodes may be referred to hereinafter as "root nodes" or "root network nodes." For example, if four network trees are desired to service the multicast traffic, four of the network nodes will be selected as "root" nodes. Then, after the root nodes are selected, each of the remaining network nodes will perform a shortest path first (SPF) calculation to determine the network tree path between itself and each of the root nodes. Once the network tree paths are determined, the multicast traffic can be sent to the appropriate destination nodes in the network 100.

Each of the network nodes 102(a)-102(f) may be assigned with a root priority, and the information pertaining to the root priority for each of the network nodes may be stored in a database of the network nodes 102(a)-102(b). Additionally, in one example, the root priority information may also be stored in a local routing information base (RIB) table ("routing table"). The local RIB table may be stored locally in a memory unit of the network nodes 102(a)-102(f) and may also be accessed by all of the nodes in the network 100. A network administrator in communication with a network bridge device (not shown in FIG. 1) that is coupled to the network nodes 102(a)-102(f) may indicate that, e.g., four network tree paths are desired in accordance with one or more network policies. The network bridge device may then indicate to all of the network nodes 102(a)-102(f) to select four root nodes and to build four network tree paths that are rooted at the four root nodes. Since each of the network nodes 102(a)-102(f) is able to access the database or routing table, each of the network nodes 102(a)-102(f) is able to identify which of the network nodes 102(a)-102(f) that should be classified as root network nodes. For example, the four network nodes that have the highest priority listed in the routing table are identified as the root network nodes. Upon identifying the four root network nodes, the remaining network nodes perform the SPF calculation with respect to each of these four root network nodes to determine the four network tree paths. It should be appreciated that any number of network tree paths may be desired, and thus, any number of root network nodes may be identified.

From time to time, however, the network 100 may experience a network disruption event or a network topology change. For example, FIG. 1 shows network node D as being removed from the network 100 at reference numeral 106. Additionally, FIG. 1 shows network link 104(5) being disconnected from the network 100 at reference numeral 108. A network disruption event or network topology change may also be detected when a new network node is added to the network 100 (e.g., if network node D is added to the network 100 after it was removed from the network 100) or when a new network link is added to the network 100 (e.g., if network link 104(5) is added to the network 100 after it was removed from the network 100). In response to detecting these network disruption events and network topology changes, the network nodes are able to optimize the selection of new root network nodes and network tree paths, as described herein.

Figure 2:
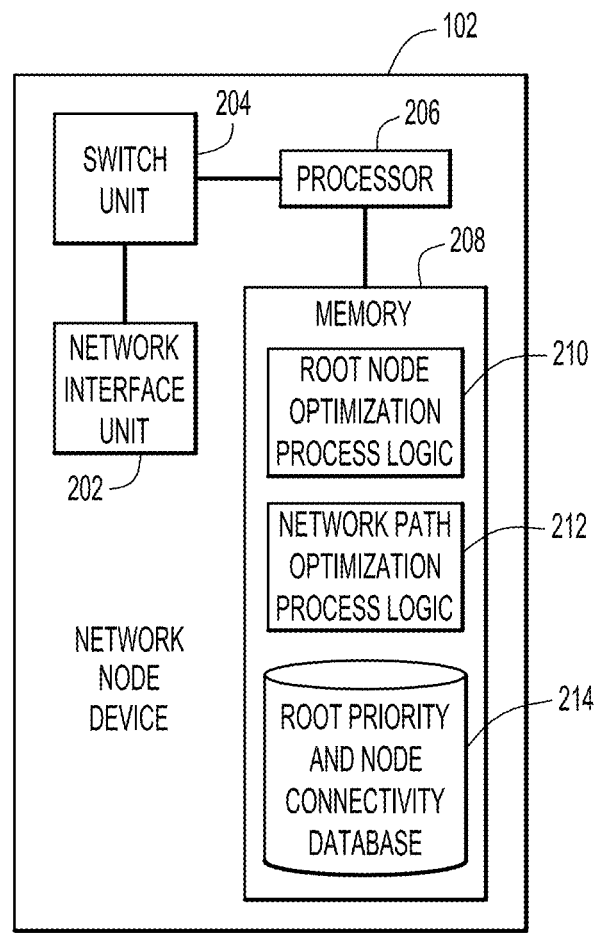
FIG. 2 is an example of a block diagram of a network node configured to optimize a selection of root network nodes for network tree paths and to optimize routing for network tree paths in response to the network disruption event or network topology change.

Reference is now made to FIG. 2. FIG. 2 shows an example block diagram of a network node device ("network node"). The network node is shown at reference numeral 102, and it should be appreciated that this network node may represent any of the network nodes 102(a)-102(f) depicted in FIG. 1 and described above. The network node 102 comprises a network interface unit 202, a switch unit 204, a processor 206 and a memory 208. The network interface unit 202 is configured to receive communications (e.g., data packets) from one or more other network nodes in the network 100 and to send communications from the network node 102 to other network nodes in the network 100. The network interface unit 202 is coupled to the switch unit 204. The switch unit 204 is configured to perform packet switching/forwarding operations on packets received from other network nodes in the network 100. Additionally, the switch unit 204 is configured to select network nodes in the network 100 to operate as root nodes for network tree paths in response to a network disruption event, as described herein. The switch unit 204 is coupled to the processor 206. The switch unit 204 may be embodied in one or more application specific integrated circuits. The processor 206 is, for example, a microprocessor or microcontroller that is configured to execute program logic instructions (i.e., software) for carrying out various operations and tasks of the network node 102, as described herein. For example, the processor 206 is configured to execute root node optimization process logic 210 to optimize selection of root network nodes and network path optimization process logic 212 to optimize selection of network tree paths. The functions of the processor 206 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 208 may comprise read only memory (ROM), random access memory (RAM), magnetic disk storage media devices, optical storage media devices, flash memory devices, electrical, optical, or other physical/tangible (non-transitory) memory storage devices. The memory 208 stores software instructions for the root node optimization process logic 210 and the network path optimization process logic 212. The memory 208 may also host a root priority and node connectivity database ("database") 214 that stores, for example, root priority information for each of the network nodes along with node connectivity information for each of the network nodes. Thus, in general, the memory 206 may comprise one or more computer readable storage media (e.g., a memory storage device) encoded with software comprising computer executable instructions and when the software is executed (e.g., by the processor 206) it is operable to perform the operations described for the root node optimization process logic 210 and the network path optimization process logic 212.

The root node optimization process logic 210 and the network path optimization process logic 212 may take any of a variety of forms, so as to be encoded in one or more tangible computer readable memory media or storage device for execution, such as fixed logic or programmable logic (e.g., software/computer instructions executed by a processor), and the processor 206 may be an application specific integrated circuit (ASIC) that comprises fixed digital logic, or a combination thereof.

In still another example, the processor 206 may be embodied by digital logic gates in a fixed or programmable digital logic integrated circuit, which digital logic gates are configured to perform the root node optimization process logic 210 and the network path optimization process logic 212. In general, the root node optimization process logic 210 and the network path optimization process logic 212 may be embodied in one or more computer readable storage media encoded with software comprising computer executable instructions and when the software is executed operable to perform the operations described hereinafter.

In general, one or more of the network nodes 102(a)-102(f) may be identified as root nodes for network tree paths in network 100. The network tree paths in network 100 may be used for multicast traffic to be sent within the network 100. To establish the network tree paths in the network 100, the network nodes 102(a)-102(f) are configured with a root node election algorithm, which may be a part of the root node optimization process logic 210. The root node election algorithm enables the network nodes 102(a)-102(f) to access the RIB (e.g., the database 214) to determine which of the network nodes 102(a)-102(f) have the highest priority. The highest priority network nodes are selected, in order, as root nodes based on the number of network trees paths desired. For example, if four network tree paths are sought, the highest priority network node is designated as the first root node, the second highest priority network node is designated as the second root node and so on. Once the highest priority network nodes 102(a)-102(f) are selected, the network nodes 102(a)-102(f) run an SPF algorithm, which may be a part of the network path optimization process logic 212. The SPF algorithm identifies the network tree paths between the remaining network nodes and the root network nodes.

However, as explained above, network disruption events and network topology changes may occur within the network 100. In response to these network changes, each of the network nodes 102(a)-102(f) is configured to modify the network tree paths that were initially determined during the steady network state (e.g., when there was no disruption in the network 100). Under existing techniques, in response to a network disruption event or topology change, each of the network nodes 102(a)-102(f) undergoes the same root election algorithm and the SPF algorithm to identify new root nodes and to elect new corresponding network tree paths. In other words, if, for example, network node D is removed from the network 100 (as shown at reference numeral 106 in FIG. 1), the remaining network nodes 102(a)-102(c), 102(e) and 102(f) each evaluate the root priority information for the remaining network nodes and select and identify, in order, an appropriate number of the highest priority network nodes to be designated as the root nodes for corresponding network tree paths. Upon selecting these root nodes, the remaining network nodes perform the SPF algorithm to determine the network tree paths for all of the selected root nodes.

Re-executing the root election algorithm and the SPF algorithm, however, is processing intensive and often results in redundant root nodes or network tree paths being selected. For example, if a network disruption event results in a root node being removed from the network 100, the existing techniques require that all root nodes be identified again and that an SPF operation be performed for all of the network nodes, even if some or all of the root nodes remain unchanged. Similarly, if a network topology change results in removal of a network link (as shown at reference numeral 108 in FIG. 1), the existing techniques require that all network tree paths be re-determined, even if some or all of the network tree paths are not affected by the network topology change. The techniques described herein optimize the selection of root network nodes and network tree paths to avoid or minimize these redundancies and to reduce the processing requirements for the network nodes to perform such optimizations.

Reference is now made to FIGS. 3A and 3B, which show data fields of the database 214 comprising root priority information. These data fields are accessed by, for example, the switch unit 204 of a network node to optimize the selection of root network nodes in response to a network disruption event. FIG. 3A shows data 302 that comprises a list of the network nodes 102(a)-102(f) in the network 100. Additionally, data 302 stores root node priority information associated with each of the network nodes 102(a)-102(f). If one or more network tree paths are required in the network 100, the data 302 also stores information indicating whether or not a network node is designated as a root network node and, if so, the root node order for that particular network node.

In response to a network disruption event (e.g., network node D being removed from the network 100), the data 302 is modified appropriately. For example, as shown in FIG. 3A, when network node D is removed from the network 100, the data 302 is updated and data fields corresponding to network node D are removed. Since network node D is removed from the network 100, the node priority information changes for each of the remaining network nodes. In the example shown in FIG. 3A, before network node D is removed from the network 100, network node D has a root node priority of "3," network node E has a root node priority of "4," network node A has a root node priority of "5" and network node F has a root node priority of "6." After network node D is removed from the network 100, the root node priority for network node E changes from "4" to "3," the root node priority for network node A changes from "5" to "4" and the root node priority for network node F changes from "6" to "5."

FIG. 3B shows data 304 that comprises a list of the network nodes that are identified as root network nodes, the order in which these root nodes are identified and the root node priority information associated with these root nodes. In the example where four root nodes are required for four network tree paths, before network node D is removed from the network 100, the four root nodes are identified, in order, as network nodes B, C, D and E (corresponding to the four highest priority network nodes). When network node D is no longer classified as a root node (since it is no longer in the network), new root nodes are to be identified. Since network node A has increased its priority from "5" to "4," network node A is selected as the fourth root node. Under existing techniques, the resulting four root nodes would be identified, in order, as root nodes B, C, E and A (corresponding to their respective root node priority information). However, the techniques presented herein optimize this selection by placing the newly added root node (i.e., root node A) in the same root node order location as the removed root node (i.e., root node D). In other words, under the optimization techniques herein, the four root nodes would be identified, in order, as root nodes B, C, A and E. That is, network node A would be identified as the third root node, and network node E would be identified as the fourth root node even though root node E has a higher root node priority than root node A. If root node D later rejoins the network 100 (and maintains a root priority of "3"), the four root nodes would be identified, in order, as root nodes B, C, D and E, as before (since, in accordance with the optimization techniques, root node D would replace the root order of root node A). Thus, the order of the root nodes is determined without changing the root priority information for the network nodes.

In other words, in response to a network disruption event, the remaining network nodes in the network 100 select a new set of root nodes such that the newly selected set maintains the same order as the set of root nodes during the steady network state as closely as possible. For example, the order of the root nodes in the new set is determined such that at least one common network node in the new set is maintained in the same order as that in the set of root nodes during the steady network state. In the above example, after network node D is removed from the network, root nodes B, C and E maintain their root node order (as order "1," order "2" and order "4," respectively), and root node A replaces the root node order of the removed root node D. By maintaining the order of the newly selected set as close as possible to the set during the steady network state, the SPF operation for the root nodes that have the same order as the previous set of root nodes is minimized (e.g., such that it is least disruptive). Said another way, in the example above, the remaining network nodes will perform an SPF operation to determine the new network tree path associated with (new) root node A, but will perform only a minimal SPF operation for root nodes B, C and E to obtain corresponding network tree paths, since the root nodes are in the same root order as the previous set. In one example, for scenarios involving policy based root priority changes, the remaining network nodes may not need to perform any additional SPF operations for root nodes B, C and E. Thus, by using these optimization techniques, the network nodes utilize less processing power and less network bandwidth resources when compared to existing techniques for selecting the new set of root nodes and generating the corresponding new network tree paths.

Reference is now made to FIG. 4, which shows data fields of the database 214 comprising network tree path connectivity information. These data fields are accessed by, for example, the switch unit 204 of a network node to optimize the selection of network tree paths. FIG. 4 shows data 402 that comprises a list of the network nodes 102(*a*)-102(*f*) in the network, and associated network connectivity ("node connectivity") information for each of the network nodes before and after a network topology change (e.g., when network node D is removed and when the network link between network node B and network node F is removed from the network 100). As shown, the network connectivity information indicates the existing links between network nodes. For example, network connectivity "A-B" indicates that there is a network link between network node A and network node B (i.e., network link 104(1) in FIG. 1).

When a network topology change event occurs, the network nodes remaining in the network 100 perform a connectivity check to determine new network connectivity information ("new node connectivity information"). In other words, each of the remaining network nodes performs a connectivity check to determine its connection to other network nodes. The new network connectivity information for each of the remaining network nodes is compared to previous network connectivity information for the network nodes during the steady network state (i.e., before the network topology change). For example, the remaining network nodes may compare an adjacency database (comprising, for example, a current intermediate system or type length value listed in the link state protocols or routing table) to a prior adjacency database (comprising, for example, a prior intermediate system or type length value) to determine whether or not one or more connections associated with the network node has been disrupted. For example, if the values in the adjacency databases match, then the network node will not detect a disrupted connection. On the other hand, if the values in the adjacency databases do not match, then the network node will detect a disrupted connection. The current adjacency database and the prior adjacency database may be part of the database 214 accessible by the network nodes.

If a network node determines that a connection with another network node has been disrupted, the network node identifies a network link corresponding to the disrupted connection and rebuilds the connection with the disconnected node by generating a network tree path using one or more remaining network links. If a network node determines that a connection has not been disrupted, the network node maintains the network link with the other network node. Thus, in response to a network topology change, network tree paths are reconstructed only for disconnections between network nodes. In the example shown in FIG. 4, the network connectivity information changes for network nodes A, B and F after the network topology change, but the network connectivity information does not change for network nodes C and E. As a result, network tree paths are reconstructed only for network nodes A, B and F and not for network nodes C and E. On the contrary, existing techniques require that, in response to a network topology change, all network tree paths are reconstructed in response to any network topology change, which results in redundant network tree paths being generated. In other words, existing techniques would require that the network tree paths for all network nodes A, B, C, E and F be reconstructed. Thus, the current techniques optimize network tree path determination by maintaining existing network tree paths when possible and reconstructing only disrupted network connections between network nodes. These techniques reduce the processing requirements for network nodes to perform the network tree path optimization techniques.

Figure 5:
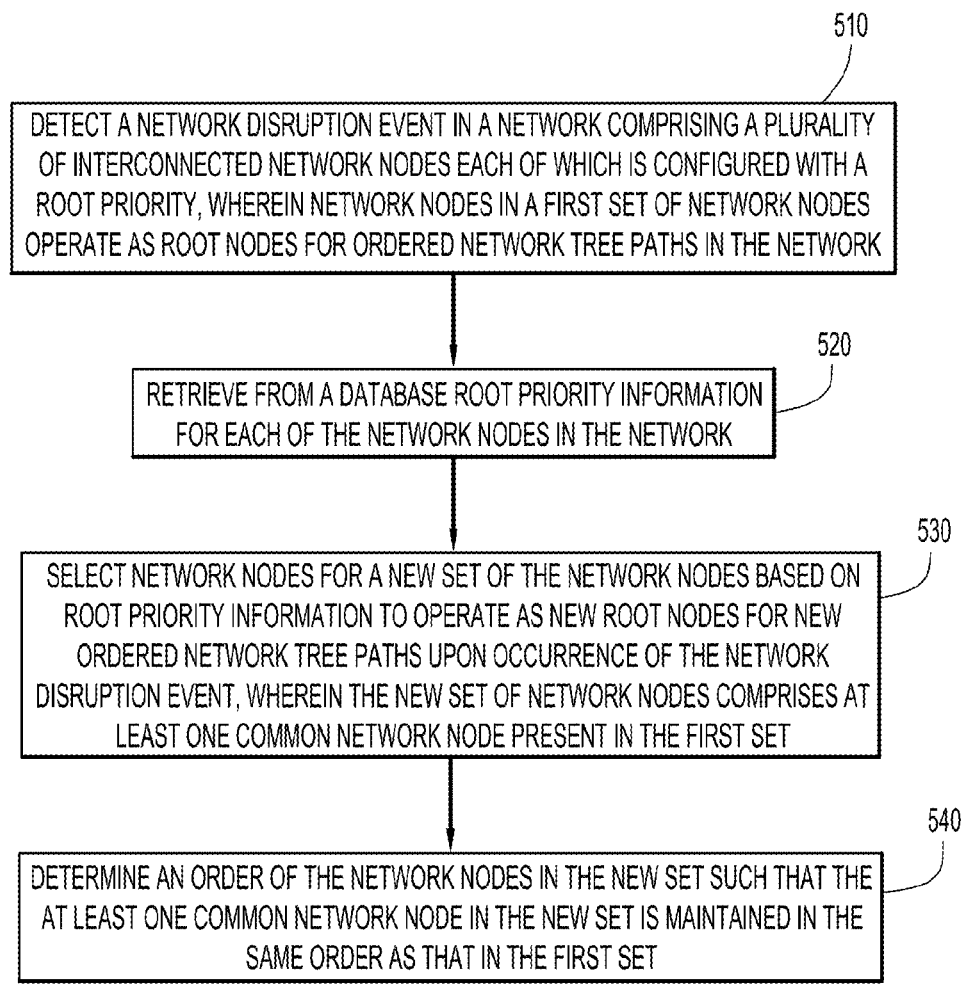
FIG. 5 shows an example flowchart depicting operations performed by the network node to optimize a selection of root network nodes for network tree paths.

Reference is now made to FIG. 5 that shows operations of the root node optimization process logic 210. FIG. 5 shows an example flowchart depicting operations performed by a network node (e.g., one or more of the network nodes 102(*a*)-102(*f*)) to optimize a selection of root network nodes for network tree paths. The operations shown in FIG. 5 may be initiated, for example, by the switch unit 204 of the network node. At operation 510, the network node detects a network disruption event in a network comprising a plurality of interconnected network nodes, each of which is configured with a root priority. The network nodes in a first set of network nodes operate as root nodes for ordered network tree paths in the network. At operation 520, the network node retrieves from a database root priority information for each of the network nodes in the network. The network node then selects, at operation 530, network nodes for a new set of the network nodes based on root priority information to operate as new root nodes for new ordered network tree paths upon occurrence of the network disruption event. The new set of network nodes comprises at least one common network node present in the first set. At operation 540, the network node determines an order of the network nodes in the new set such that the at least one common network node in the new set is maintained in the same order as that in the first set.

Figure 6:
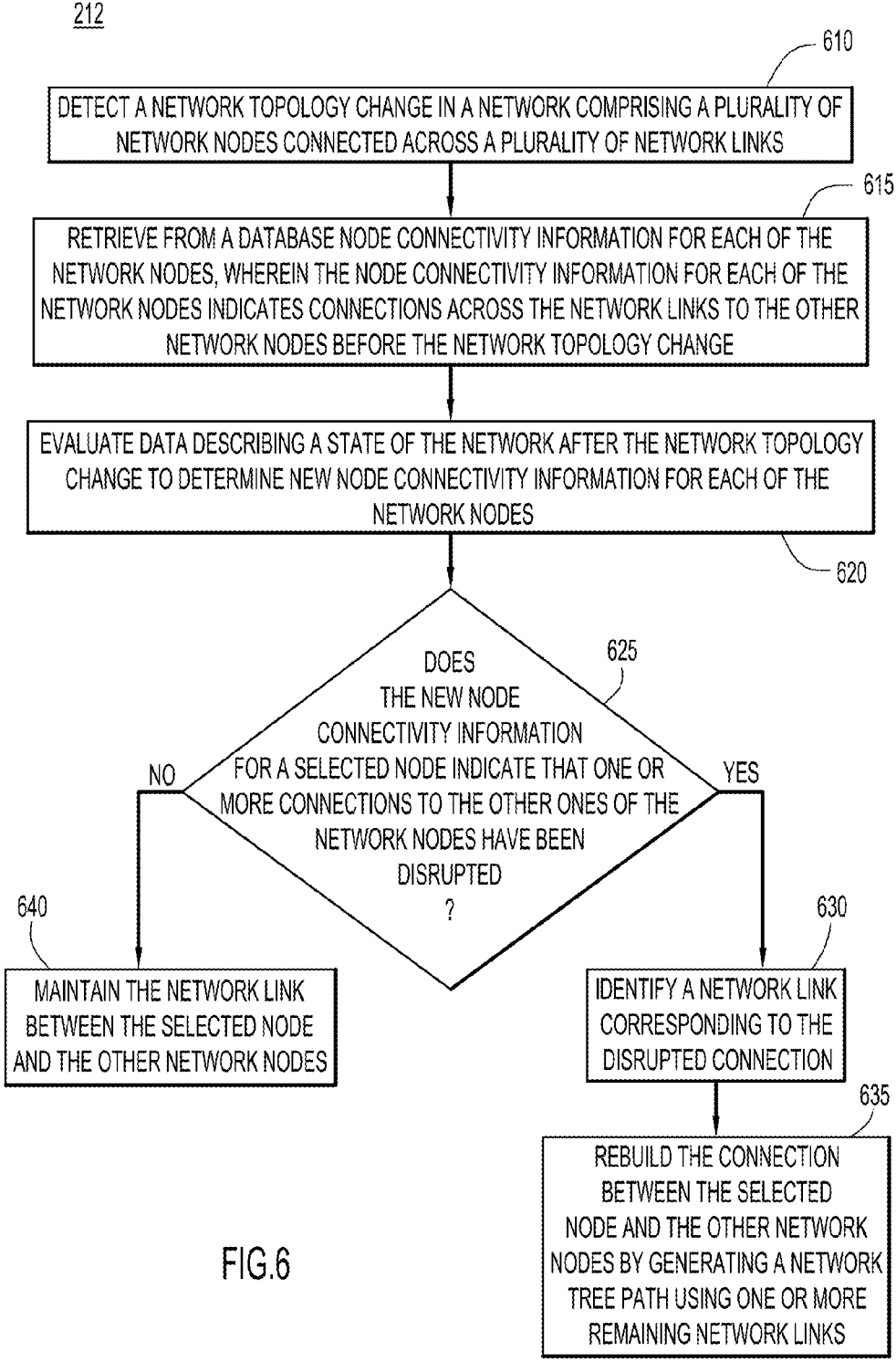
FIG. 6 shows an example flowchart depicting operations performed by the network node to optimize routing for network tree paths.

Reference is now made to FIG. 6 that shows operations of the network path optimization process logic 212. FIG. 6 shows a flowchart depicting operations performed by a network node (e.g., one or more of the network nodes 102(a)-102(f)) to optimize routing for network tree paths in response to the network disruption event. The operations shown in FIG. 6 may be initiated, for example, by the switch unit 204 of the network node. At operation 610, the network node detects a network topology change in a network comprising a plurality of network nodes connected across a plurality of network links. At operation 614, the network node retrieves from a database node connectivity information for each of the network nodes. The node connectivity information for each of the network nodes indicates connections across the network links to other network nodes before the network topology change. At operation 620, the network node evaluates data describing a state of the network after the network topology change to determine new node connectivity information for each of the network nodes. The network node then determines, at operation 625, whether the new node connectivity information for a selected node indicates that one or more connections to the other network nodes have been disrupted. If so, the network node identifies, at operation 630, a network link corresponding to the disrupted connection, and at operation 635, rebuilds the connection between the selected node and the other network nodes by generating a network tree path using one or more remaining network links. If the network node determines that there has been a disruption (i.e., if the answer to decision 625 is "no"), the network node, at operation 640, maintains the network link between the selected node and the other network nodes.

It should be appreciated that the techniques described above in connection with all embodiments may be performed by one or more computer readable storage media that is encoded with software comprising computer executable instructions to perform the methods and steps described herein. For example, the operations performed by one or more of the network nodes 102(a)-102(f) may be performed by one or more computer or machine readable storage media (non-transitory) or device executed by a processor and comprising software, hardware or a combination of software and hardware to perform the techniques described herein.

In sum, a method is provided comprising: at a switch unit of a network node, detecting a network disruption event in a network comprising a plurality of interconnected network nodes each of which is configured with a root priority, wherein network nodes in a first set of the network nodes operate as root nodes for ordered network tree paths in the network; retrieving from a database root priority information for each of the network nodes in the network; selecting network nodes for a new set of the network nodes based on the root priority information to operate as new root nodes for new ordered network tree paths upon occurrence of the network disruption event, wherein the new set of network nodes comprises at least one common network node present in the first set; and determining an order of the network nodes in the new set such that the at least one common network node in the new set is maintained in the same order as that in the first set.

In addition, a method is provided comprising: at a switch unit of a network node, detecting a network topology change in a network comprising a plurality of network nodes connected across a plurality of network links; retrieving from a database node connectivity information for each of the network nodes, wherein the node connectivity information for each of the network nodes indicates connections across the network links to other network nodes before the network topology change; evaluating data describing a state of the network after the network topology change to determine new node connectivity information for each of the network nodes; for a selected network node, determining whether or not the new node connectivity information for the selected network node indicates that one or more connections to the other network nodes have been disrupted; when the node connectivity information indicates that a connection has been disrupted, identifying a network link corresponding to the disrupted connection and rebuilding the connection between the selected network node and the other network nodes by generating a network tree path using one or more remaining network links; and when the node connectivity information indicates that a connection has not been disrupted, maintaining the network link between the selected network node and the other network nodes.

In addition, one or more computer readable storage media encoded with software is provided comprising computer executable instructions and when the software is executed operable to: detect a network disruption event in a network comprising a plurality of interconnected network nodes each of which is configured with a root priority, wherein network nodes in a first set of the network nodes operate as root nodes for ordered network tree paths in the network; retrieve from a database root priority information for each of the network nodes in the network; select network nodes for a new set of the network nodes based on the root priority information to operate as new root nodes for new ordered network tree paths upon occurrence of the network disruption event, wherein the new set of network nodes comprises at least one common network node present in the first set; and determine an order of the network nodes in the new set such that the at least one common network node in the new set is maintained in the same order as that in the first set.

Furthermore, one or more computer readable storage media encoded with software is provided comprising computer executable instructions and when the software is executed operable to: detect a network topology change in a network comprising a plurality of network nodes connected across a plurality of network links; retrieve from a database node connectivity information for each of the network nodes, wherein the node connectivity information for each of the network nodes indicates connections across the network links to other network nodes before the network topology change; evaluate data describing a state of the network after the network topology change to determine new node connectivity information for each of the network nodes; determine for a selected network node whether or not the new node connectivity information for the selected network node indicates that one or more connections to the other network nodes have been disrupted; when the node connectivity information indicates that a connection has been disrupted, identify a network link corresponding to the disrupted connection and rebuild the connection between the selected network node and the other network nodes by generating a network tree path using one or more remaining network links; and when the node connectivity information indicates that a connection has not been disrupted, maintain the network link between the selected network node and the other network nodes.

Additionally, an apparatus is provided, comprising: a network interface unit; a switch unit coupled to the network interface unit; a memory; and a processor coupled to the switch unit and the memory and configured to: detect a network disruption event in a network comprising a plurality of interconnected network nodes each of which is configured with a root priority, wherein network nodes in a first set of the network nodes operate as root nodes for ordered network tree paths in the network; retrieve from a database root priority information for each of the network nodes in the network; select network nodes for a new set of the network nodes based on the root priority information to operate as new root nodes for new ordered network tree paths upon occurrence of the network disruption event, wherein the new set of network nodes comprises at least one common network node present in the first set; and determine an order of the network nodes in the new set such that the at least one common network node in the new set is maintained in the same order as that in the first set.

Furthermore, an apparatus is provided comprising: a network interface unit; a switch unit coupled to the network interface unit; a memory; and a processor coupled to the switch unit and the memory and configured to: detect a network disruption event in a network comprising a plurality of interconnected network nodes each of which is configured with a root priority, wherein network nodes in a first set of the network nodes operate as root nodes for ordered network tree paths in the network; retrieve from a database root priority information for each of the network nodes in the network; select network nodes for a new set of the network nodes based on the root priority information to operate as new root nodes for new ordered network tree paths upon occurrence of the network disruption event, wherein the new set of network nodes comprises at least one common network node present in the first set; and determine an order of the network nodes in the new set such that the at least one common network node in the new set is maintained in the same order as that in the first set.

The above description is intended by way of example only. Various modifications and structural changes may be made therein without departing from the scope of the concepts described herein and within the scope and range of equivalents of the claims.

What is claimed is:

1. A method comprising:
    at a switch unit of a network node, detecting a network disruption event in a network comprising a plurality of interconnected network nodes each of which is configured with a root priority, wherein a first set of the network nodes operate as a first set of root nodes for ordered network tree paths in the network;
    retrieving from a database root priority information for each of the network nodes in the network;
    selecting, based on the root priority information, a second set of the network nodes to operate as a second set of root nodes for new ordered network tree paths selected upon occurrence of the network disruption event, wherein the second set of root nodes replaces the first set of root nodes and wherein the second set of root nodes comprises at least one common network node that was also a root node in the first set of root nodes; and
    determining an order of the network nodes in the second set of root nodes such that the at least one common network node in the second set of root nodes is maintained in the same order as that in the first set of root nodes.

2. The method of claim 1, wherein determining comprises determining the order of the network nodes in the second set of root nodes without changing the root priority information for the network nodes in the second set of root nodes.

3. The method of claim 2, wherein determining comprises determining the order of the network nodes in the second set of root nodes without having to determine network tree paths for the at least one common network node.

4. The method of claim 1, wherein detecting the network disruption event comprises detecting that one or more of the network nodes in the first set of root nodes has been removed from the network.

5. The method of claim 1, wherein detecting the network disruption event comprises detecting that one or more additional network nodes have been added to the network.

6. The method of claim 1, further comprising storing data describing the order of the network nodes in the first set root nodes and data describing the order of the network nodes in the second set of root nodes in the database.

7. The method of claim 6, further comprising updating a routing table accessible by all of the network nodes in the network with data describing the order of the network nodes in the first set of root nodes and data describing the order of the network nodes in the second set of root nodes.

8. A method comprising:
    at a switch unit of a network node, detecting a network topology change in a network comprising a plurality of network nodes connected across a plurality of network links;
    retrieving from a database node connectivity information for each of the network nodes, wherein the node connectivity information for each of the network nodes indicates connections across the network links to other network nodes before the network topology change;
    evaluating data describing a state of the network after the network topology change to determine new node connectivity information for each of the network nodes;
    for a selected network node, comparing the new node connectivity information for the selected node to connectivity information for the selected node before the topology change to determine whether or not the new node connectivity information for the selected network node indicates that one or more connections to the other network nodes have been disrupted;
    when the node connectivity information comparison indicates that a connection has been disrupted, identifying a network link corresponding to the disrupted connection and rebuilding the connection between the selected network node and the other network nodes by generating a network tree path using one or more remaining network links; and
    when the node connectivity information comparison indicates that a connection has not been disrupted, maintaining the network link between the selected network node and the other network nodes.

9. The method of claim 8, wherein detecting comprises detecting a link failure of one of the network links in the network or a link addition of a new network link in the network.

10. The method of claim 8, further comprising comparing the new node connectivity information for the selected network node determined after the network topology change to the node connectivity information for the selected network node determined before the network topology change to determine whether or not there is a match.

11. The method of claim 10, wherein comparing comprises comparing an adjacency database associated with the new node connectivity information to a prior adjacency database associated with the node connectivity information determined before the network topology change.

12. The method of claim 8, wherein maintaining comprises maintaining the network link between the selected network node and the other network nodes without having to determine network tree paths between the selected network node and the other network nodes.

13. The method of claim 8, further comprising updating the database with the new node connectivity information and updating a routing table accessible by all of the network nodes in the network with the new node connectivity information.

14. One or more non-transitory computer readable storage media encoded with software comprising computer executable instructions and when the software is executed operable to:
- detect a network disruption event in a network comprising a plurality of interconnected network nodes each of which is configured with a root priority, wherein a first set of the network nodes operate as a first set of root nodes for ordered network tree paths in the network;
- retrieve from a database root priority information for each of the network nodes in the network;
- select, based on the root priority information, a second set of the network nodes to operate as a second set of root nodes for new ordered network tree paths selected upon occurrence of the network disruption event, wherein the second set of root nodes replaces the first set of root nodes and wherein the second set of root nodes comprises at least one common network node that was also a root node in the first set of root nodes; and
- determine an order of the network nodes in the second set of root nodes such that the at least one common network node in the second set of root nodes is maintained in the same order as that in the first set second set of root nodes.

15. The non-transitory computer readable storage media of claim 14, wherein the instructions that are operable to determine comprise instructions that are operable to determine the order of the network nodes in the second set of root nodes without changing the root priority information for the network nodes in the second set of root nodes.

16. The non-transitory computer readable storage media of claim 15, wherein the instructions operable to determine the order of the network nodes in the second set of root nodes comprise instructions operable to determine the order of the network nodes in second set of root nodes without having to determine network tree paths for the at least one common network node.

17. One or more computer non-transitory readable storage media encoded with software comprising computer executable instructions and when the software is executed operable to:
- detect a network topology change in a network comprising a plurality of network nodes connected across a plurality of network links;
- retrieve from a database node connectivity information for each of the network nodes, wherein the node connectivity information for each of the network nodes indicates connections across the network links to other network nodes before the network topology change;
- evaluate data describing a state of the network after the network topology change to determine new node connectivity information for each of the network nodes;
- for a selected network node, compare the new node connectivity information for the selected node to connectivity information for the selected node before the topology change to determine whether or not the new node connectivity information for the selected network node indicates that one or more connections to the other network nodes have been disrupted;
- when the node connectivity information comparison indicates that a connection has been disrupted, identify a network link corresponding to the disrupted connection and rebuild the connection between the selected network node and the other network nodes by generating a network tree path using one or more remaining network links; and
- when the node connectivity information comparison indicates that a connection has not been disrupted, maintain the network link between the selected network node and the other network nodes.

18. The non-transitory computer readable storage media of claim 17, further comprising instructions operable to compare the new node connectivity information for the selected network node determined after the network topology change to the node connectivity information for the selected network node determined before the network topology change to determine whether or not there is a match.

19. The non-transitory computer readable storage media of claim 18, wherein the instructions operable to compare comprise instructions operable to compare an adjacency database associated with the new node connectivity information to a prior adjacency database associated with the node connectivity information determined before the network topology change.

20. An apparatus comprising:
- a network interface unit;
- a switch unit coupled to the network interface unit;
- a memory; and
- a processor coupled to the switch unit and the memory and configured to:
  - detect a network disruption event in a network comprising a plurality of interconnected network nodes each of which is configured with a root priority, wherein a first set of the network nodes operate as a first set of root nodes for ordered network tree paths in the network;
  - retrieve from a database root priority information for each of the network nodes in the network;
  - select, based on the root priority information, a second set of the network nodes to operate as a second set of root nodes for new ordered network tree paths selected upon occurrence of the network disruption event, wherein the second set of root nodes replaces the first set of root nodes and wherein the second set of root nodes comprises at least one common network node present in the first set of root nodes; and
  - determine an order of the network nodes in the second set of root nodes such that the at least one common network node in the second set of root nodes is maintained in the same order as that in the first set of root nodes.

21. The apparatus of claim 20, wherein the processor is further configured to determine the order of the network nodes in the second set of root nodes without changing the root priority information for the network nodes in the second set of root nodes.

22. An apparatus comprising:
- a network interface unit;
- a switch unit coupled to the network interface unit;
- a memory; and
- a processor coupled to the switch unit and the memory and configured to:
  - detect a network topology change in a network comprising a plurality of network nodes connected across a plurality of network links;
  - retrieve from a database node connectivity information for each of the network nodes, wherein the node connectivity information for each of the network nodes indicates connections across the network links to other network nodes before the network topology change;

evaluate data describing a state of the network after the network topology change to determine new node connectivity information for each of the network nodes;

for a selected network node, compare the new node connectivity information for the selected node to connectivity information for the selected node before the topology change to determine whether or not the new node connectivity information for the selected network node indicates that one or more connections to the other network nodes have been disrupted;

when the node connectivity information comparison indicates that a connection has been disrupted, identify a network link corresponding to the disrupted connection and rebuild the connection between the selected network node and the other network nodes by generating a network tree path using one or more remaining network links; and when the node connectivity information comparison indicates that a connection has not been disrupted, maintain the network link between the selected network node and the other network nodes.

23. The apparatus of claim 22, wherein the processor is further configured to compare an adjacency database associated with the new node connectivity information to a prior adjacency database associated with the node connectivity information determined before the network topology change.

* * * * *